(12) United States Patent
Al-Jabr et al.

(10) Patent No.: US 12,743,076 B2
(45) Date of Patent: Sep. 22, 2026

(54) METHOD AND SYSTEM FOR MANAGING HYDROCARBON ASSETS IN OPERATING FACILITIES

(71) Applicant: Saudi Arabian Oil Company, Dhahran (SA)

(72) Inventors: Khalid A. Al-Jabr, Dammam (SA); Dahham M. Al-Anazi, Dammam (SA); Md Fazlul Alam Chowdhury, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 503 days.

(21) Appl. No.: 18/366,899

(22) Filed: Aug. 8, 2023

(65) Prior Publication Data

US 2025/0053162 A1 Feb. 13, 2025

(51) Int. Cl.
*G05B 19/418* (2006.01)

(52) U.S. Cl.
CPC ... *G05B 19/41875* (2013.01); *G05B 19/4183* (2013.01)

(58) Field of Classification Search
CPC .......... G05B 19/41875; G05B 19/4183; G06Q 10/20; G06Q 10/06393
See application file for complete search history.

(56) References Cited

U.S. PATENT DOCUMENTS 7,557,702 B2 7/2009 Eryurek et al.
7,634,384 B2 12/2009 Eryurek et al.
8,103,463 B2 1/2012 Kalgren et al.
(Continued)

FOREIGN PATENT DOCUMENTS

CN 102968700 A 3/2013
CN 110135705 A 8/2019
(Continued)

OTHER PUBLICATIONS

Aggarwal et al., "Integration of Reliability and Capacity in Performance Measure of a Telecommunication Network", IEEE Transactions on Reliability, vol. R-34, No. 2, Jun. 1985.
(Continued)

*Primary Examiner* — Christopher E. Everett
(74) *Attorney, Agent, or Firm* — Dinsmore & Shohl LLP

(57) ABSTRACT

Embodiments herein a method for managing hydrocarbon assets for a hydrocarbon operating facility. One embodiment includes receiving asset data associated with a plurality of hydrocarbon assets at an operations facility, determining a plurality of categories of asset data, and determining, by the computing device, a value for each of the plurality of categories of asset data. Some embodiments include determining a value for an asset management index (AMI) for the hydrocarbon operating facility, wherein the value for AMI includes the value for each of the plurality of categories of asset data, normalizing the AMI, and determining an acceptable range for AMI. Some embodiments include determining whether the AMI is within the acceptable range for AMI, and communicating data related to whether the AMI is within the acceptable range to the hydrocarbon asset management output translation module.

19 Claims, 10 Drawing Sheets

(56) References Cited

U.S. PATENT DOCUMENTS

| | | | | |
|---|---|---|---|---|
| 2005/0091102 | A1* | 4/2005 | Retsina | G06Q 10/10<br>705/7.39 |
| 2008/0262898 | A1* | 10/2008 | Tonchev | G06Q 10/0639<br>705/7.38 |
| 2016/0312552 | A1 | 10/2016 | Early et al. | |
| 2017/0309094 | A1* | 10/2017 | Farahat | G07C 5/0841 |
| 2018/0218307 | A1* | 8/2018 | Natarajan | G06Q 50/06 |
| 2019/0292908 | A1* | 9/2019 | Karimi Vajargah | E21B 49/00 |

FOREIGN PATENT DOCUMENTS

| | | | |
|---|---|---|---|
| CN | 112700127 | A | 4/2021 |
| CN | 114418258 | A | 4/2022 |
| CN | 114462753 | A | 5/2022 |
| CN | 114841481 | A | 8/2022 |
| CN | 115392672 | A | 11/2022 |
| CN | 115660170 | A | 1/2023 |
| JP | 20006520960 | A | 9/2006 |
| JP | 2008128699 | A | 6/2008 |
| KR | 20130065800 | A | 6/2013 |

OTHER PUBLICATIONS

"Performance Excellence Process: Closing the Gap", Salomon Advisory Services, Jun. 21, 2017.

Srivastava, Principles, Practices and Management), Maintenance Engineering, p. 15, 2010.

* cited by examiner

METHOD AND SYSTEM FOR MANAGING HYDROCARBON ASSETS IN OPERATING FACILITIES

TECHNICAL FIELD

Embodiments provided herein generally relate to managing assets in operating facilities and, more specifically, to a process for monitoring a total asset management index (AMI) in operating facilities from different aspects for measuring, monitoring, troubleshooting, and improving.

BACKGROUND

Operating facilities are continuously striving to improve efficiency. Efficiency may take many different forms, such as employee efficiency, equipment efficiency, operational efficiency, etc. As such, operating facilities and/or departments may measure efficiency differently. This may cause issues because the different operating facilities may report high efficiencies, but the cost and output do not match the efficiency data. Additionally, efficiency data across operating facilities may be incongruent, so that administrators are not able to match efficiencies accurately across operating facilities, departments, or companies.

As such, a need exists in the industry for a method and system for managing hydrocarbon assets in operating facilities.

SUMMARY

Embodiments herein a method for managing hydrocarbon assets for a hydrocarbon operating facility. One embodiment includes receiving asset data associated with a plurality of hydrocarbon assets at an operations facility, determining a plurality of categories of asset data, and determining, by the computing device, a value for each of the plurality of categories of asset data. Some embodiments include determining a value for an asset management index (AMI) for the hydrocarbon operating facility, wherein the value for AMI includes the value for each of the plurality of categories of asset data, normalizing the AMI, and determining an acceptable range for AMI. Some embodiments include determining whether the AMI is within the acceptable range for AMI, and communicating data related to whether the AMI is within the acceptable range to the hydrocarbon asset management output translation module.

One embodiment of a system includes a hydrocarbon operating facility that includes hydrocarbon assets, a hydrocarbon asset operational data memory that stores asset data related to the hydrocarbon operating facility, at least one hydrocarbon asset monitoring module for receiving data related to the hydrocarbon assets, and a hydrocarbon asset management output translation module that provides output data related to the hydrocarbon assets at the hydrocarbon operating facility. Some embodiments include a memory component that stores a hydrocarbon asset management software module, that when executed by a processor, receives, from the at least one hydrocarbon asset monitoring module via a transmitter of the hydrocarbon operating facility, at least a portion of the asset data associated with the hydrocarbon assets at an operations facility, where at least a portion of the asset data was received via a sensor of at least one of one of the hydrocarbon assets and determines a plurality of categories of asset data, where the plurality of categories include an asset maintainability index (MI), an asset performance and efficiency index (P&EI), an objective compliance index (OCI), and/or a level of competency index (LCI), and where each of the plurality of categories of asset data include key performance indicators (KPIs). In some embodiments the system may determine a value for each of the plurality of categories of asset data, wherein determining the value for each of the plurality of categories of asset data includes determining a value for each of the KPIs, determine a value for an asset management index (AMI) for the hydrocarbon operating facility, where the value for AMI includes the value for each of the plurality of categories of asset data, and normalize the AMI. Some embodiments may determine an acceptable range for AMI, determine whether the AMI is within the acceptable range for AMI, and in response to determining that the AMI is not within the acceptable range for AMI, utilize the hydrocarbon asset management output translation module to implement a change to at least a portion of the hydrocarbon assets to adjust a respective KPI until AMI is within the acceptable range for AMI.

Embodiments of non-transitory computer-readable storage medium for managing hydrocarbon assets for a hydrocarbon operating facility includes logic that, when executed by a computing device, causes the computing device to receive asset data associated with a plurality of hydrocarbon assets at an operations facility and determine a plurality of categories of asset data, where the plurality of categories include an asset maintainability index (MI), an asset performance and efficiency index (P&EI), an objective compliance index (OCI), and/or a level of competency index (LCI), and where each of the plurality of categories of asset data include key performance indicators (KPIs). Some embodiments may cause the computing device to determine a value for each of the plurality of categories of asset data, where determining the value for each of the plurality of categories of asset data includes determining a value for each of the KPIs, determine a value for an asset management index (AMI) for the hydrocarbon operating facility, wherein the value for AMI includes the value for each of the plurality of categories of asset data, and determine an acceptable range for AMI. Some embodiments cause the computing device to determine whether the AMI is within the acceptable range for AMI and in response to determining that the AMI is not within the acceptable range for AMI, implement a change to at least one of the KPI until AMI is within the acceptable range for AMI.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Embodiments disclosed herein include a system and/or method for managing assets in a hydrocarbon operating facility. Specifically, embodiments provided herein include a process for monitoring the total asset management index (AMI) in operating facilities from different aspects for measuring, monitoring, troubleshooting, and improving. AMI is an estimated value that includes a combination of parameters to represent (i) plant reliability and integrity in operating facilities from different aspects (e.g., process, maintenance, safety, asset management, and human resources); (ii) measure overall asset management performances in operating facilities and identify the gaps to be addressed and monitored; and (iii) standardize corporate asset management criteria to benchmark between operating facilities.

Accordingly, embodiments of this disclosure are configured to evaluate the integrated AMI in operating facilities from process, maintenance, inspection, safety, human resources and asset management perspectives. This is based on the original input of data after normalizing the original input by dimension treatment, an optimized linear regression function for the input by using the read points and operating windows.

Specifically, sensor data, user input regarding hydrocarbon assets, and/or other data associated about the hydrocarbon assets (collectively "asset data") may be received for a plurality of assets. Embodiments may additionally normalize the data (e.g., asset data, AMI, and/or KPI). This data may be normalized across operating facilities, departments, and/or across other division. After the normalization, AMI is limited between two values, which are zero and one (0-1.00). If the normalized AMI is close to one (1.00), this indicates that the hydrocarbon operating facility (or other measured division) is reliable based on the measured parameters. If the normalized AMI is low, the hydrocarbon operating facility is not reliable in some specific aspects. In such embodiments, a drilldown of normalized AMI may be performed, which may identify reliability deficiencies in the business line can be identified at departmental level. Thus, embodiments provide a statistical measure of changes in a representative group of individual data points to measure reliability performance in each operating facility. Some embodiments may be configured to use trends of predict future KPIs.

Figure 1A:
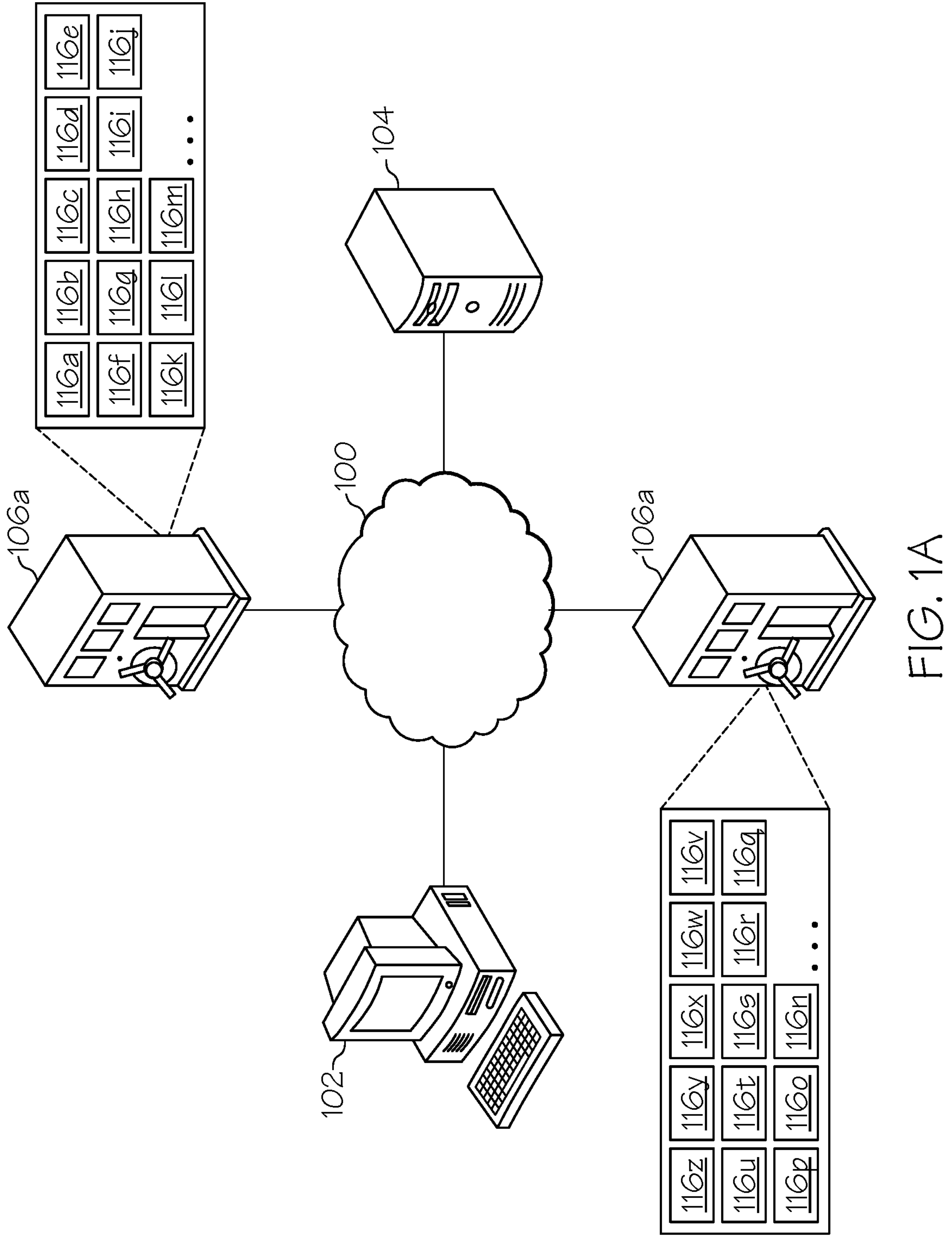
FIG. 1A depicts a computing environment for managing assets in operating facilities, according to embodiments disclosed herein.

Referring now to the drawings, FIG. 1A depicts a computing environment for managing assets in an hydrocarbon operating facility 106*a*, 106*b* (collectively referred to as "hydrocarbon operating facility 106"), according to embodiments disclosed herein. As illustrated, the computing environment may include a network 100. The network may include a wide area network (WAN), such as the internet, a cellular network, a public switch telephone network (PSTN), a satellite network, a WiMax network, etc. The network 100 may include a local area network (LAN), such as an Ethernet, a wireless fidelity (Wi-Fi) network, etc. The network 100 may include a personal area network (PAN), such as a Bluetooth connection, a Zigbee connection, and/or other peer-to-peer connection.

Coupled to the network 100 are a user computing device 102, a hydrocarbon asset control system 104, a first hydrocarbon operating facility 106*a*, and a second operating facility 106*b*. The user computing device 102 may be configured as a personal computer, laptop, mobile device, and/or other computing device configured for interacting with a user and/or providing output. The hydrocarbon asset control system 104 may be configured as a personal computer, server, laptop, mobile device, and/or other computing device that is configured for determining AMI and/or performing other functions described herein. The operating facilities 106 may include one or more hydrocarbon assets 116*a*-116*m*, 116*n*-1162 (collectively "hydrocarbon assets 116") that may be monitored and/or controlled, as described herein.

The hydrocarbon assets 116 may be configured as one or more petrochemical generation systems or corrosion management systems as well as sub-devices within the aforementioned, including but not limited to reactors, valves, actuators, instrumentation, sensors, gauges, piping, reactors, separators, and the like. For example, in petrochemical generation systems and/or corrosion management systems, the various metrics (and associated data) that may be monitored may include flow rate of the various streams into and/or exiting the various units, temperatures of the various streams into, within, and/or exiting the various units, pressures of the various streams into, within, and/or exiting the various units, fluid levels within the various units, concentrations of different compositions in the various stream into, within, and/or exiting the various units, power consumption or loading of the various units, or any combination of the previous. Similarly, hydrocarbon assets 116, as described herein may include personnel, experts, and/or other human capital that are used to determine AMI.

The hydrocarbon asset control system 104 may be configured cause the hydrocarbon asset control system 104 to receive sensor data from at least one of the hydrocarbon assets 116 and calculate AMI from the received data, as well as provide analysis and output, such as the output provided in FIGS. 2-11. The hydrocarbon asset control system 104 may additionally adjust operation (or facilitate adjustment of operation) of one or more of the hydrocarbon assets 116 to obtain a desired AMI or other metric.

Figure 1B:
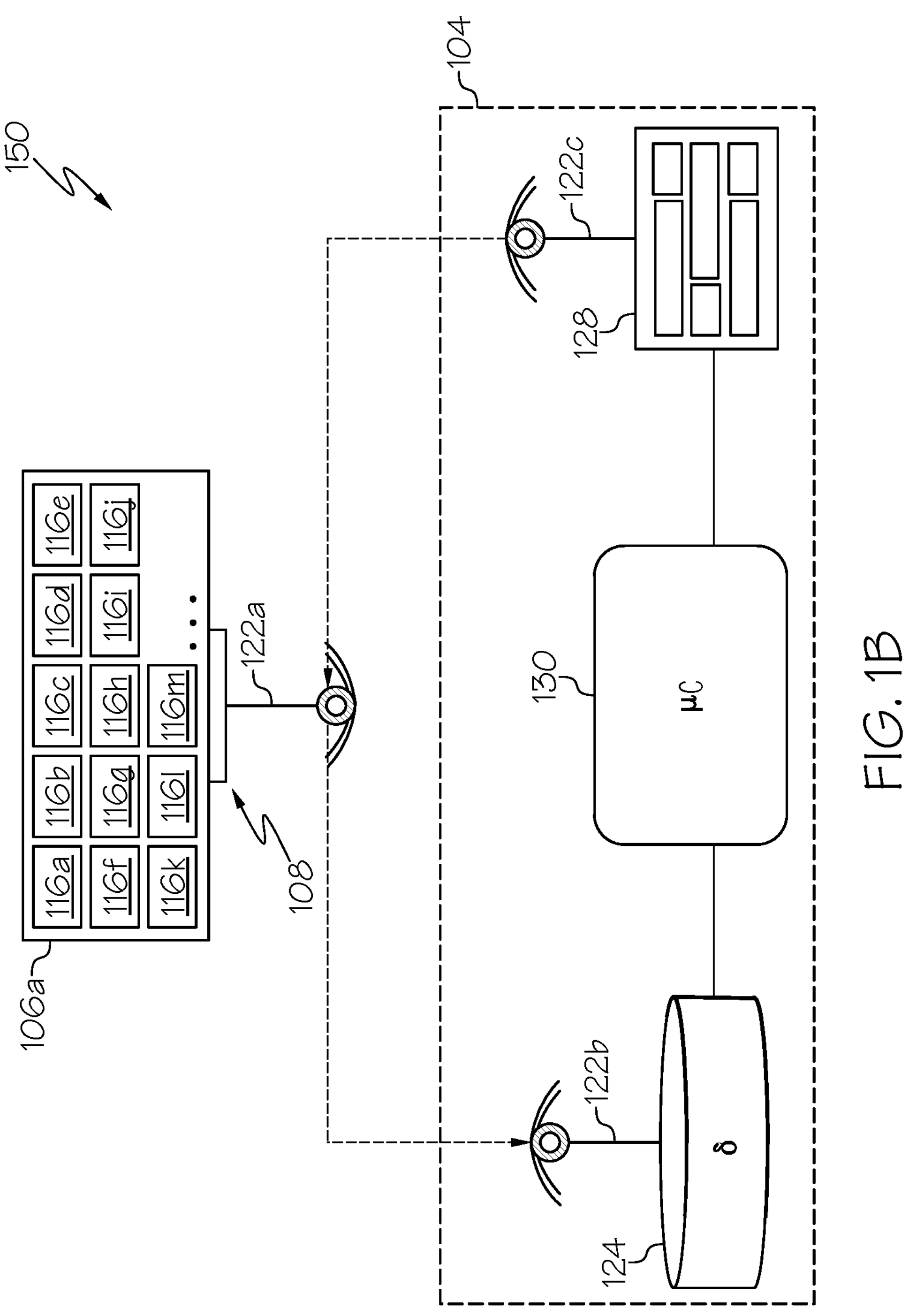
FIG. 1B depicts other hardware for an asset management system that provides input data and implements AMI, according to embodiments provided herein.

FIG. 1B depicts other hardware for an asset management system that provides input data and determines AMI, according to embodiments provided herein. As illustrated, the hydrocarbon processing system 150 includes one or more hydrocarbon operating facilities 106*a*. The hydrocarbon operating facility 106*a* may include hydrocarbon asset monitoring modules 108 that may receive asset data. While the hydrocarbon asset monitoring module 108 may be coupled to and/or part of the hydrocarbon operating facility 106*a* (as depicted in FIG. 1B), this is one example. Some embodiments may include a hydrocarbon asset monitoring module 108 coupled to and/or integrated with one or more of the hydrocarbon assets 116. In some embodiments, the hydrocarbon asset monitoring module 108 may include and/or be coupled to at least one storage device that stores an identifier of the hydrocarbon asset 116, a type of the hydrocarbon asset 116, and/or other asset data. The hydrocarbon asset monitoring module 108 may include a computing device for communicating via its respective network and may include and/or be coupled with a transmitter 122*a* (which may be configured as a transmitter, receiver and/or a transceiver) for communicating the asset data from hydrocarbon asset monitoring module 108 to the hydrocarbon asset control system 104.

It will be understood that in embodiments that have a plurality of different hydrocarbon assets 116, each hydrocarbon asset 116 may be equipped with a radio frequency (RF) tag or other transmitter that may broadcast or otherwise communicate this asset data to the hydrocarbon asset control system 104. In some embodiments, each hydrocarbon asset 116 may be coupled with a computing device that collects and organizes the data before sending to the hydrocarbon asset control system 104. The hydrocarbon asset 116 may include one or more petrochemical generation systems or corrosion management systems as well as sub-devices within the aforementioned, including but not limited to reactors, valves, actuators, instrumentation, sensors, gauges, piping, reactors, separators, and the like. In one non-limiting example, the hydrocarbon asset 116 may be configured as a corrosion management system that may include one or more acid gas treatment units that may monitor trends in various parameters of a feed gas as the acid gas is removed.

It should also be understood that "asset data" may include identifiers of the respective hydrocarbon assets 116, data related to the network of the hydrocarbon assets 116, requests from the hydrocarbon assets 116, instructions from the hydrocarbon assets 116, and/or other data associated with the hydrocarbon assets 116.

It should be understood that asset data may be used to determine key performance indicators (KPIs), such as rework data, equipment availability data, mean time between failures (MTBF), qualitative repair history index (QRHI), failure reporting, analysis, and corrective action system (FRACAS) index, relief valve inspection index, on stream inspection index, asset integrity management solution (AIMS), lubrication index, corrosion management solution (CMS), utilizing reliability, availability, and maintenance modeling (RAM), flaring index, energy conservation index, production index, competency index for technicians, competency index for operators, competency index for inspectors, etc. Rework data (RD) may be data associated to the number of rework jobs compared to the total number of completed work orders. This information may be a derivative of sensor data and/or may be determined directly. As an example, sensor data from a hydrocarbon asset 116 may determine the number (or volume) of output. This number may be compared with an expected number or volume of output. As such, the rework data may be determined at the asset and communicated to the hydrocarbon asset control system 104 and/or the hydrocarbon asset control system 104 may receive the raw sensor data and calculate the rework data.

Equipment availability (EA) data may measure the mechanical availability of the hydrocarbon assets 116. Equipment availability assumes 100% availability and subtracts any downtime (non-operating timeframes) based on the duration of work orders created against the associated hydrocarbon assets 116, the downtime of which may include timeframes in which the hydrocarbon assets 116 are not functioning due to needed repairs or being under repair, emergency shutdowns, environmental conditions, upstream logistical issues, downstream logistical issues, or any combination of the previous.

MTBF measures reliability of hydrocarbon assets 116 and provides the time between each failure. MTBF can be denoted in months (or days, weeks, years, etc.) and provides the failure rate for a predetermined class of hydrocarbon assets 116.

QRHI measures the quality of information received on a hydrocarbon asset 116 against repair notifications from the hydrocarbon asset 116. This allows the hydrocarbon asset control system 104 to assess the quality of notification information received from the hydrocarbon assets 116.

FRACAS index measures the FRACAS effectiveness and utilization for reported unreliability events. This assures the reliability and safety of the hydrocarbon asset 116.

Relief valve inspection index (RVII) provides reliable safeguards against unexpected failures that can jeopardize safety and production. Overdue relief valves may be compared with the total number of relief valves.

On stream inspection index (OSII) provides safeguards against unexpected failures. These unexpected failures or overdue inspection for critical items can jeopardize safety and production by a hydrocarbon asset 116.

AIMS focuses on integrity elements risk identification and mitigation, safety critical elements, integrity performance standards, and integrity operating windows. As such, asset data, such as safety critical events, operation data, etc. may be received by the hydrocarbon asset control system 104 to determine AIMS enablers (integrity competencies, integrity information and documentation, KPIs, AIMS process management, etc.). The AMIS enablers may be utilized to provide a successful business implementation of AIMS and help achieve desired asset integrity management.

Lubrication index (LI) may evaluate lubrication performance and map different lubrication failure modes across operating facilities 106 using lubricant condition monitoring (LCM). As such, the hydrocarbon asset control system 104 may receive asset data, such as hydrocarbon asset temperature data, operating data, etc. Proper lubrication may be utilized to improve equipment reliability as improper lubrication is one of major causes of equipment failure.

Corrosion management system (CMS) is a digital platform to manage the integrity of hydrocarbon assets 116 through real-time monitoring dashboards covering more than 40,000 parameters. Also, the CMS solution may be equipped with an automated notification system, and on-demand reporting capabilities for reporting to the hydrocarbon asset control system 104.

RAM utilization focuses on receiving asset data associated with the operating facilities 106 to ensure successful business implementation of RAM and help achieve a desired level of asset management.

Flaring index may be configured to measure a flare and relief system at to prevent unsafe operations endangering the life of operating personnel. Specifically, a flare and relief system may be configured to burn excess hydrocarbon gasses that cannot be recovered. As such, embodiments may be configured to measure various data from such a system.

Energy conservation index may be configured to provide a numerical value associated with the energy efficiency performance of one or more operating facilities 106. This may receive energy usage data and output data to determine whether the hydrocarbon operating facility 106 is operating efficiently.

Production index measuring the efficiency and reliability of production supply at a hydrocarbon operating facility 106. Specifically, embodiments may receive production supply data associated with inputs and outputs and may calculate the production index may be calculated from this data.

LCI measures the competency of various employees, contractors, or others. Accordingly, LCI includes a competency index for technicians, operators, and inspectors. In some embodiments, LCI may be determined as an average of these three-competency metrics. Competency index for technicians shows a percentage of maintenance employees who are certified, compared to all employees in the hydrocarbon operating facility 106. Competency index for operators provides a percentage of operations employees who are certified versus all operations employees. Competency index for inspectors provides a percentage of inspection employees who are certified versus all inspection employees.

The hydrocarbon asset control system 104 may include and/or be coupled with one or more receivers 122*b* (which may be configured as a transmitter, receiver and/or a transceiver) for receiving the device data from the refining train parameter module 120 associated with a plurality of different devices. Depending on the embodiment, the hydrocarbon asset control system 104 may receive device data from dozens, hundreds, or even thousands of different hydrocarbon assets 116. The hydrocarbon asset control system 104 may include hydrocarbon asset operational data memory 124 (denoted in FIG. 1B as 8) for storing the received asset data, such as KPI data 938*a* (FIG. 9), asset data 938*b* (FIG. 9), and/or other data.

Hydrocarbon asset manager 130 represents one or more computing devices that executes software modules and/or operations that utilized by the hydrocarbon asset control system 104. In some embodiments, the hydrocarbon asset manager 130 includes the AMI determining logic 144*a* and hydrocarbon asset controlling logic 144*b* described with reference to FIG. 1A. As described above, the hydrocarbon asset management software module may cause the hydrocarbon asset control system 104 to receive asset data from the hydrocarbon assets 116; monitor the operation of the hydrocarbon assets 166; create and provide user interfaces depicting that operation; and provide instructions regarding adjustments to improve AMI.

The hydrocarbon asset control system 104 may also include a hydrocarbon asset management output translation module 128 that is configured to create and/or communicate instructions to output at least one graphical user interface and/or at least one AMI dashboard as provided in FIGS. 2-7 to a computing device (such as hydrocarbon asset control system 104 from FIG. 1A) and/or control at least one setting on the hydrocarbon assets 116. The hydrocarbon asset management output translation module 128 may include any hardware configured to perform this functionality, such as the hardware depicted in FIG. 9. For example, the hydrocarbon asset management output translation module 128 may include a hardware driver or controller, a control data transmitter 122*c*, a document printer, a data display, and/or any other hardware that generates an operations output that can be used to alter, enhance, or otherwise control technical operations or create a technical effect described herein.

Specifically, embodiments provided herein may receive asset data from one or more of the hydrocarbon assets 116. With the asset data, embodiments of the hydrocarbon asset control system 104 may calculate and/or determine KPIs associated with each hydrocarbon asset 116, operating facility 106, and/or department of a hydrocarbon operating facility 106 or organization. The KPIs may then be utilized to determine an index associated with that hydrocarbon asset 116, operating facility 106, and/or department of a hydrocarbon operating facility 106 or organization. As an example, an asset maintainability index (MI) may be determined from the rework data, the equipment availability data, the MTBF data, the QRHI data, the FRACAS index, the relief valve inspection index, and the on stream inspection index. The MI represents a combination of these different maintenance and inspection KPIs to measure maintenance and inspection performance related to overall hydrocarbon asset 116 management in the operating facilities 106. The MI may be calculated, for example using the following equation: MI=average (RD, QRHI, FRACAS, MTBF, EA, RVII, OSII).

Similarly, embodiments provided herein may utilize the received asset data to determine an asset performance and efficiency index (P&EI). P&EI is a combination of different asset KPIs, such as AIMS, LI, CMS, and RAM to measure asset performance and efficiency related to plant asset management in Saudi Aramco Operating Facilities. P&EI may be calculated by P&EI=average (AIMS, LI, CMS, RAM).

An objective compliance index (OCI) may additionally be determined from an average of the KPIs flaring index, energy conservation index, and production index. OCI may represent a combination of different operating facility process KPIs to measure process performance and compliance related to hydrocarbon asset 116 management in the operating facilities 106.

The weighted measure compared with the calculated index for each category, is defined as:

$$AMI = \sum_{i=1}^{N=i} w_i I_i$$

Where $w_i$: weight value for the category (i), where (i) represents departments within a facility; and $I_i$: the index value for (i).

The following formula may be used to estimate the asset management index (AMI) for each Operating Facility:

$$AMI = \sum_{i=1}^{N=i} w_i I_i = (0.4 * MI + 0.3 * P\&EI + 0.2 * OCI + 0.1 * LCI)$$

The results for this calculation will help to enhance the hydrocarbon operating facilities 106 strategies and techniques in optimizing operations and maintenance to achieve corporate objectives. If AMI is low for a hydrocarbon operating facility 106, some embodiments may back out values for each of an asset maintainability index (MI), an asset performance and efficiency index (P&EI), an objective compliance index (OCI), and a level of competency index (LCI) to determine which category is deficient. Some embodiments may be configured to back out departments to determine which department is deficient. With this information, embodiments may implement changes to improve overall AMI. Some embodiments may also provide user interfaces and define desirable values for each index.

Figure 2:
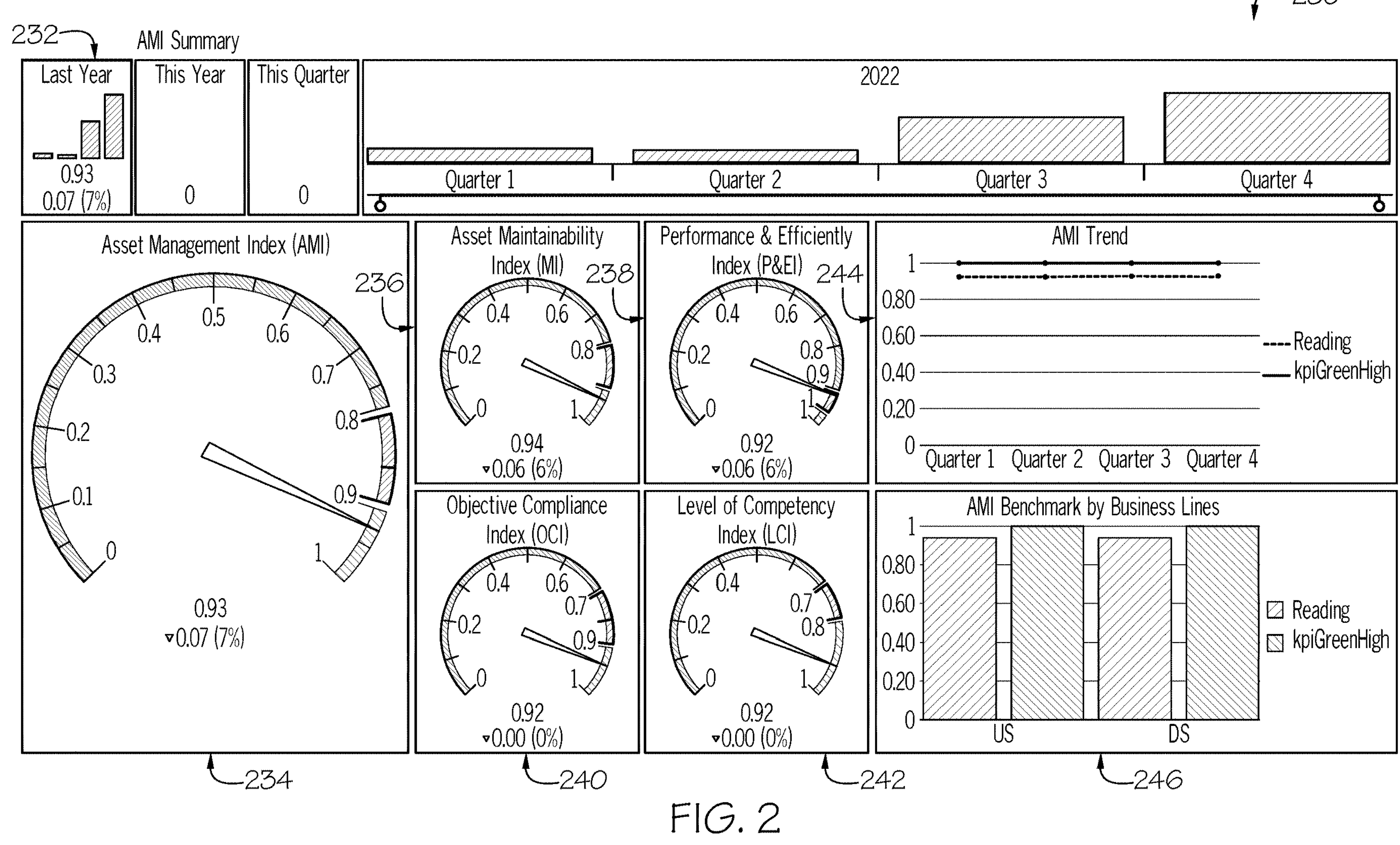
FIG. 2 depicts a user interface for providing an asset management index summary, according to embodiments provided herein.

FIG. 2 depicts a user interface 230 for providing an asset management index summary, according to embodiments provided herein. As illustrated, the user interface 230 may provide various parameters regarding AMI. Specifically, for a particular operating facility 106, department, business line, etc., embodiments may be configured to calculate AMI, determine a target AMI, and render the user interface 230. In the embodiment of FIG. 2, the user interface 230 provides AMI for an organization.

The user interface 230 may include a timeframe section 232, which provides the relative AMI for the organization over various years. As illustrated, in the past year, the organization AMI has grown to 0.93, which represents growth for the last two quarters. In AMI window 234, the current (or most recent) AMI is provided, with highlighted ranges for good AMI, acceptable AMI, and poor AMI. As illustrated, the most recent AMI for this organization is 0.93, which is in the good category and represents an improvement of 0.07 points or 7%. For this organization, good AMI ranges from about 1.0 to about 0.9. Acceptable AMI ranges from about 0.89 to about 0.8. Poor AMI ranges from about 0.79 to about 0.

Also provided in the user interface 230 are measurements for the four categories of AMI. Specifically, the user interface 230 provides MI window 236, a P&EI window 238, an OCI window 24, and an LCI window 242 are also provided. As illustrated, the MI window 236 may provide a most recent measure of the asset maintainability index for the organization, which in this embodiment is 0.94, which represents an improvement of 0.06 points or 6%. The range of good MI for this organization is about 1.0 to about 0.9. Acceptable MI ranges from about 0.89 to about 0.8. Poor MI ranges from about 0.79 to about 0. The P&EI window 238 provides that the organization P&EI is currently 0.92, which is in the acceptable category and represents an improvement of 0.08 points or 8%. The range of good P&EI for this organization is about 1.0. Acceptable P&EI ranges from about 0.99. to about 0.9. Poor MI ranges from about 0.89 to about 0. The OCI window 240 similarly provides that the most recent OCI is 0.92, which represents an improvement of 0.08 points or 8%. The range of good OCI for this organization is about 1.0 to about 0.9. Acceptable OCI ranges from about 0.89. to about 0.7. Poor MI ranges from about 0.69 to about 0. The LCI window 242 provides that the most recent LCI of the organization is 0.92, which represents an improvement of 0.8 or 8%. The range of good LCI for this organization is about 1.0 to about 0.8. Acceptable LCI ranges from about 0.79. to about 0.7. Poor LCI ranges from about 0.69 to about 0.

Also provided in the user interface 230 are an AMI trend window 244 and an AMI benchmark by business line window 246. As illustrated, the benchmark AMI is represented as being 1.0. The trend for this organization AMI over the last four quarts has been slightly below that mark. Similarly, the AMI benchmark by business lines shows that the benchmark for both the US business line and the DS business line is 1.0. The actual AMI posted for those business lines is slightly lower.

Figure 3:
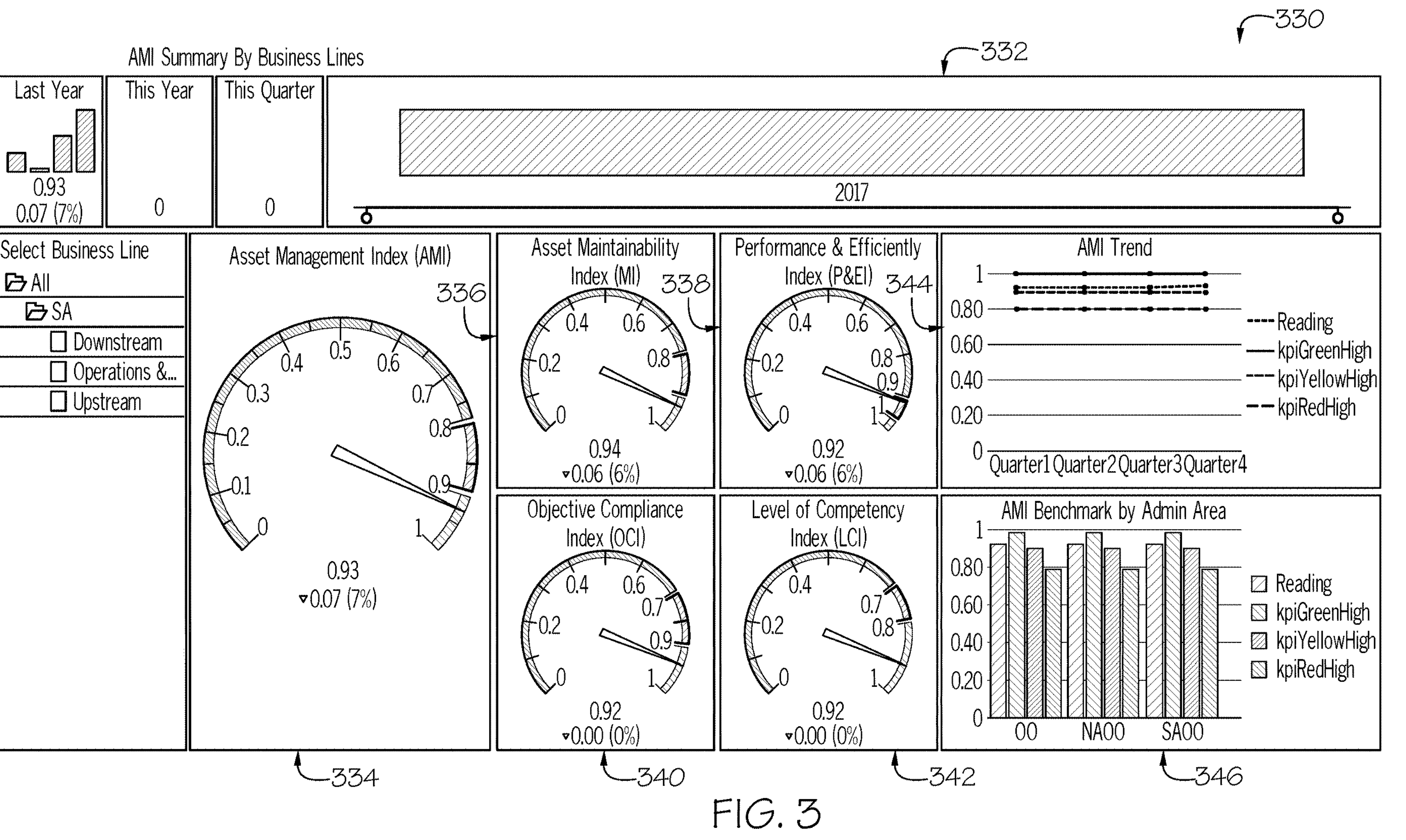
FIG. 3 depicts user interface for providing an asset management index summary by business line, according to embodiments provided herein.

FIG. 3 depicts user interface 330 for providing an asset management index summary by business line, according to embodiments provided herein. The user interface 330 may be provided in response to selection of the AMI benchmark by business line window 246 from FIG. 2 and/or via other pathway. Regardless, the user interface 330 provides the same timeframe section 332, AMI window 334, MI window 336, P&EI window 338, OCI window 340, and LCI window 342 as provided in FIG. 2, except that the data provided in those sections of the user interface 330 is relegated to a selected business line. Similarly, an AMI trend window 344 provides AMI trend data over a predetermined time period for one or more business lines against a benchmark. An AMI benchmarking by administrative area window 346 may provide benchmarking of AMI for the selected business line across different administrative areas.

Figure 4:
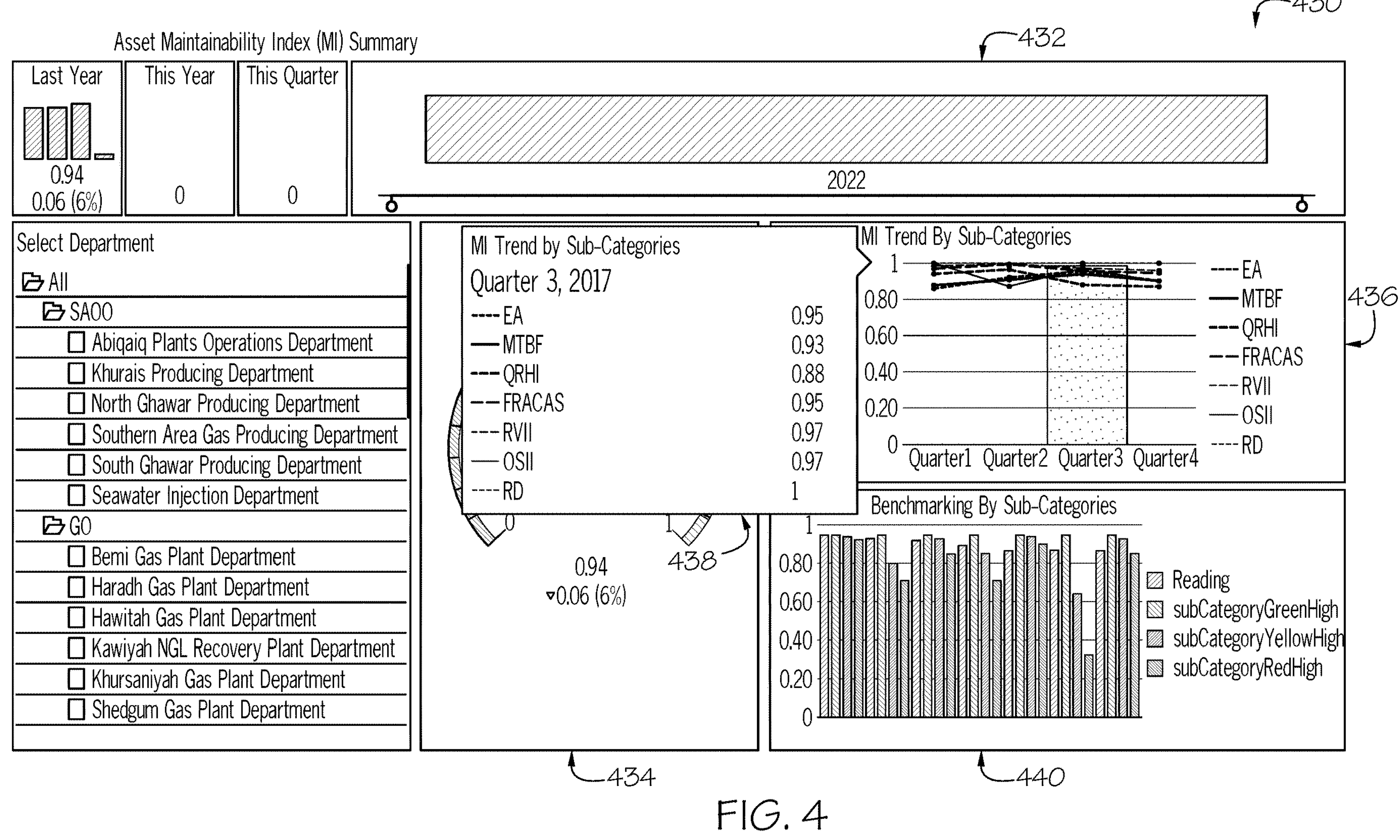
FIG. 4 depicts a user interface for providing an asset maintainability index summary, according to embodiments provided herein.

FIG. 4 depicts a user interface 430 for providing an asset maintainability index summary, according to embodiments provided herein. As illustrated, the user interface 430 provides asset maintainability index (MI) data associated with an organization. Accordingly, a timeframe window 432 may provide MI for the organization for the a predetermined period of time. A MI window 434 may provide the same MI data that was provided in the MI window 236 from FIG. 2, but the user interface 430 may additionally provide details on sub-categories of the MI data (e.g., KPIs). Specifically, a sub-category trend window 436 may provide trends associated with one or more sub-category that makes up MI. In the embodiment provided in FIG. 4, the sub-categories are the KPIs of equipment availability, mean time between failures, QRHI, FRACAS, relief valve inspection index, on stream inspection index, and rework data index are provided, with values determined for each of the KPIs.

Also provided is a sub-category option 438. In response to a user selection of the sub-category option 438, a listing of the values for each sub-category may be provide a respective value for each sub-category. A MI benchmarking by sub-categories window 440 may also be provided and may represent how each sub-category is performing against the benchmark.

Figure 5:
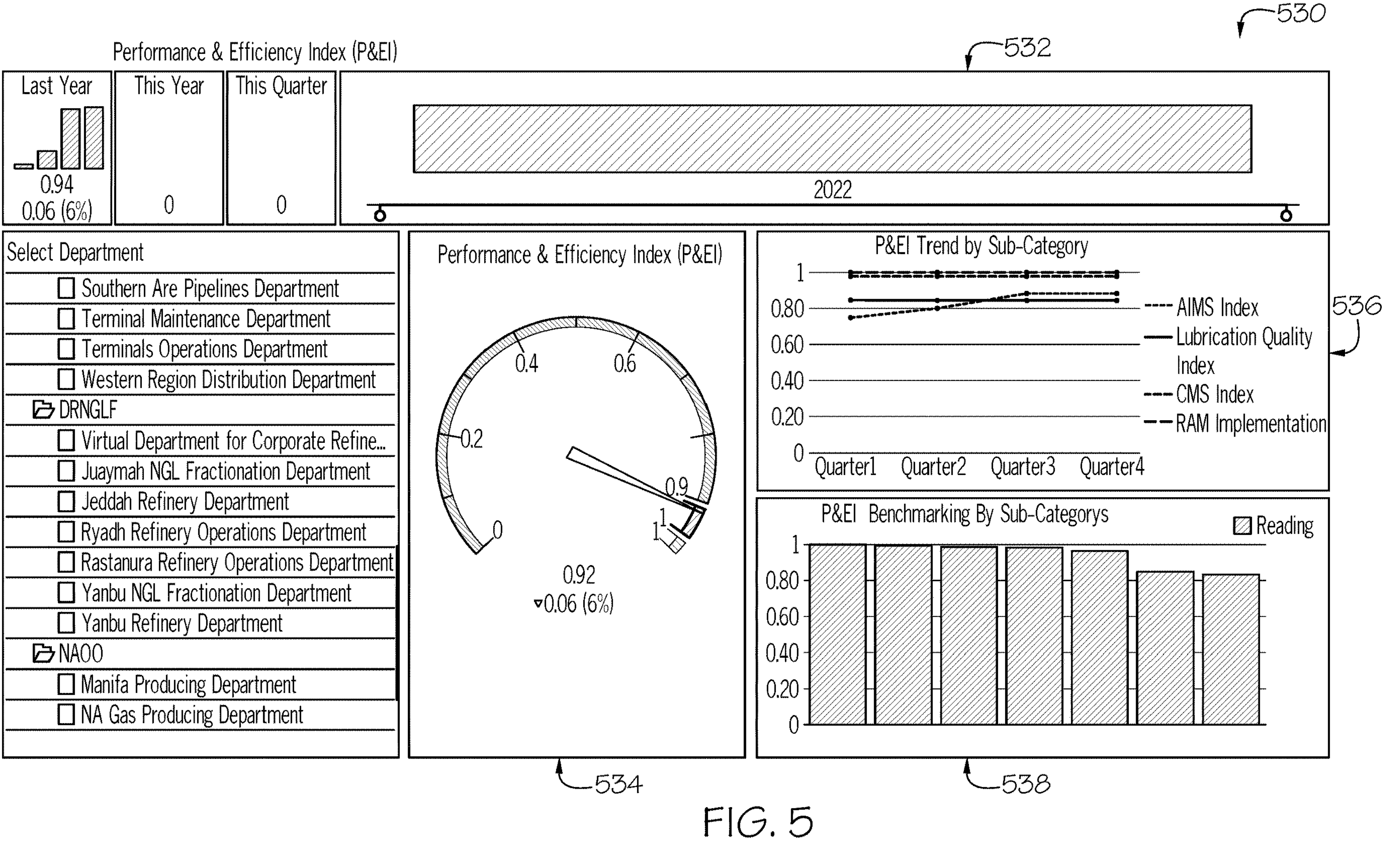
FIG. 5 depicts another user interface for providing a performance and efficiency index summary, according to embodiments provided herein.

FIG. 5 depicts another user interface 530 for providing a performance and efficiency index summary, according to embodiments provided herein. As illustrated, the user interface 530 includes a timeframe window 532 which provides performance of P&EI over a predetermined time period, such as in the last year, quarter, month, week, day, etc. A P&EI window 534 provides the same information as provided in OCI window 240 from FIG. 2. Also provided are a P&EI trend by sub-category window 536, which provides trends for each sub-category of P&EI. In the example of FIG. 5, the sub-categories are AIMS index, lubrication quality index, CMS index, and RAM utilization. A P&EI benchmarking by sub-category window 538 may also be provided, which benchmarks each of the sub-categories for the P&EI.

Figure 6:
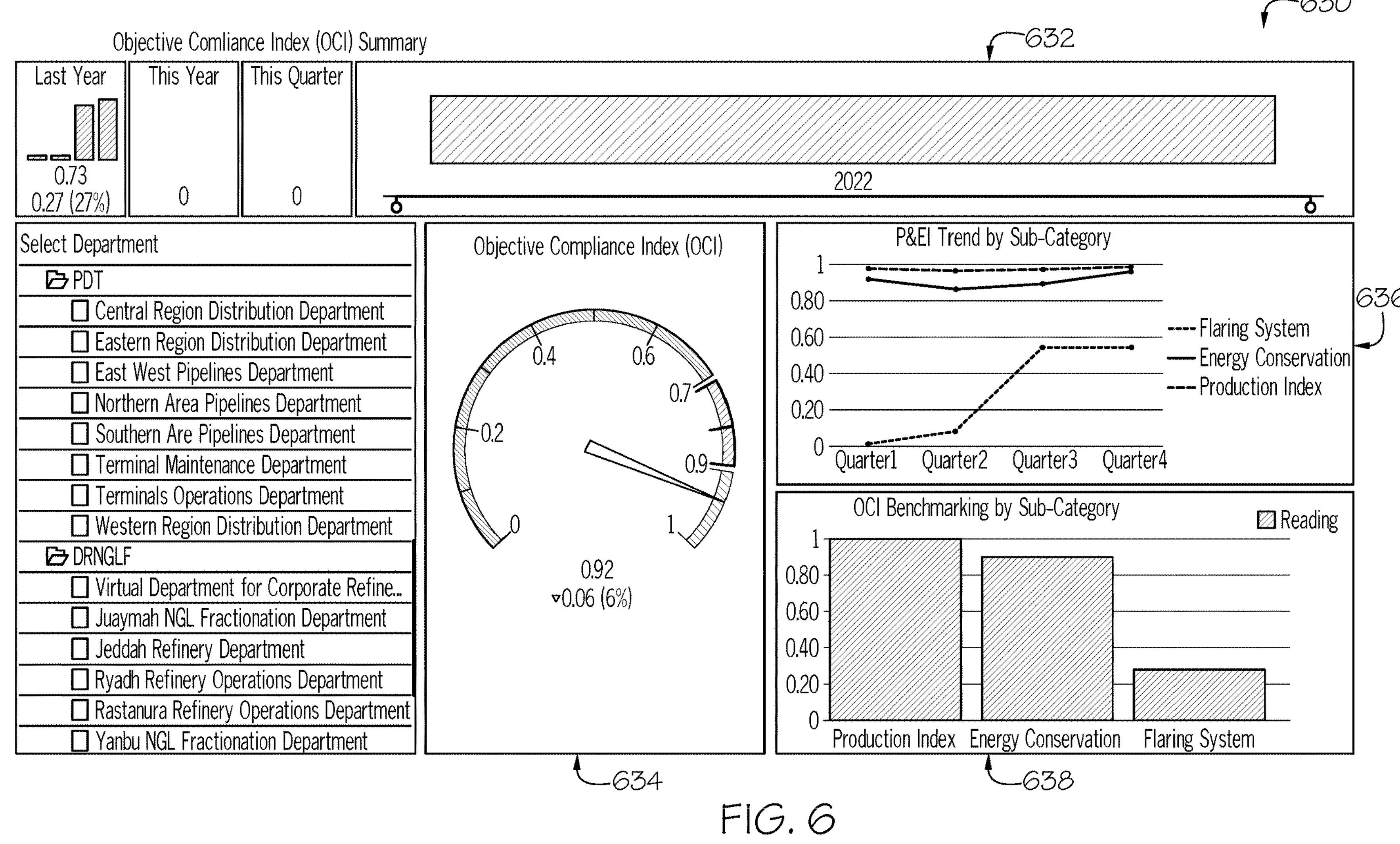
FIG. 6 depicts a user interface for providing an objective compliance index summary, according to embodiments provided herein.

FIG. 6 depicts a user interface 630 for providing an objective compliance index summary, according to embodiments provided herein. As illustrated, the user interface 630 includes a timeframe window 632, which provides OCI data across predetermined time periods. The OCI window 634 provides the same information as provided by the OCI window 240 (FIG. 2). The OCI trend by sub-category window 636 may provide trend data over a predetermined time period for each of a plurality of sub-categories of OCI. In the example of FIG. 6, the sub-categories as flaring index, energy conservation index, and production index. Also provided is an OCI benchmarking by sub-category window 638, which compares each of the sub-categories against a predetermined benchmark.

Figure 7:
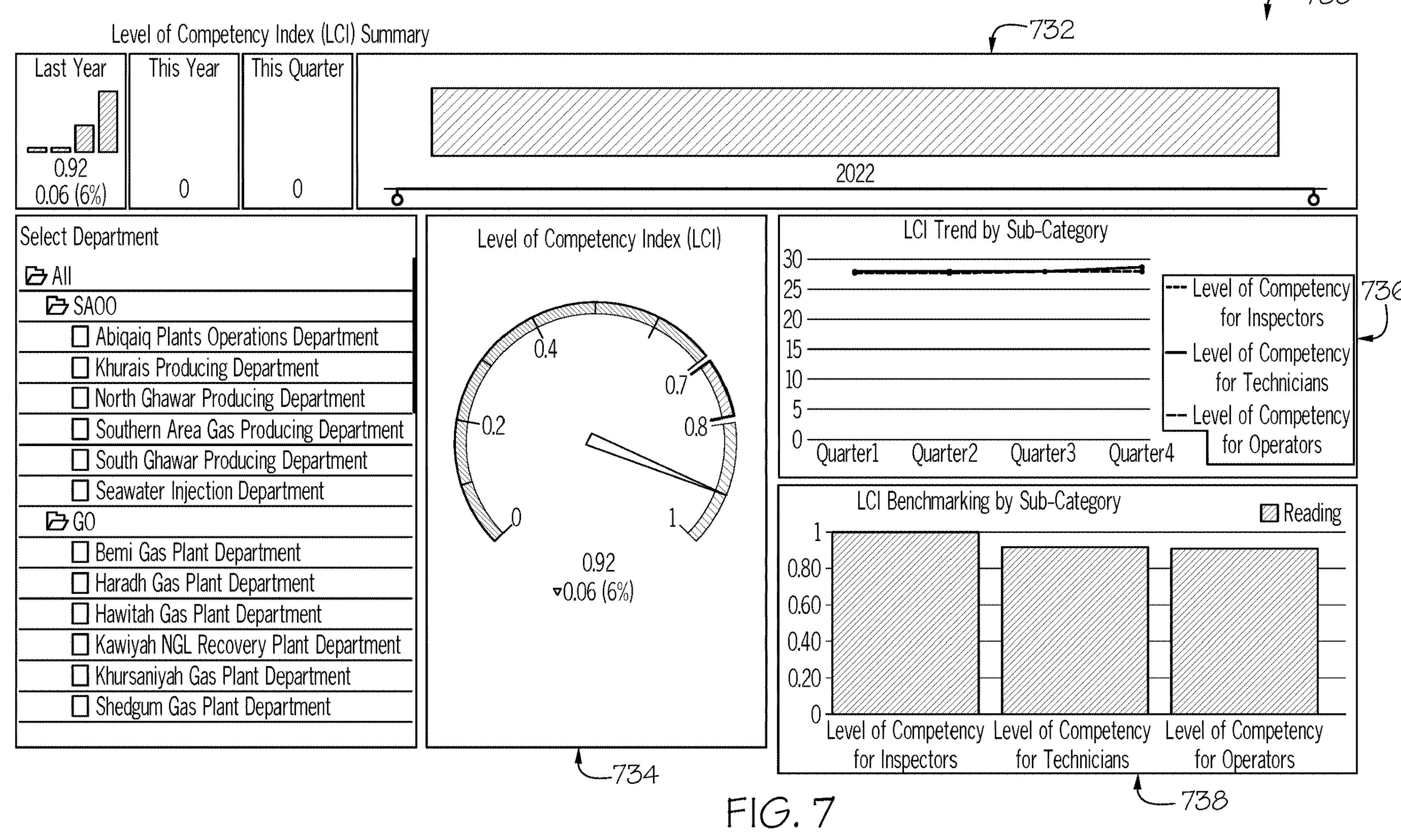
FIG. 7 depicts a user interface for providing a level of competency index summary, according to embodiments provided herein.

FIG. 7 depicts a user interface 730 for providing a level of competency index summary, according to embodiments provided herein. As illustrated, the user interface 730 includes a timeframe window 732, which provides LCI for a predetermined number of times in the past. A LCI window 734 is also included and provides the same information as the LCI window 242. An LCI trend by sub-category window 736 provides trend data for a plurality of sub-categories of LCI. In the example of FIG. 7, the sub-categories include a level of competency for technicians, a level of competency for inspectors, and a level of competency for operators. An LCI benchmarking by sub-category window 738 may provide a plurality of the sub-categories and compare those sub-categories against a predetermined benchmarking value.

Figure 8:
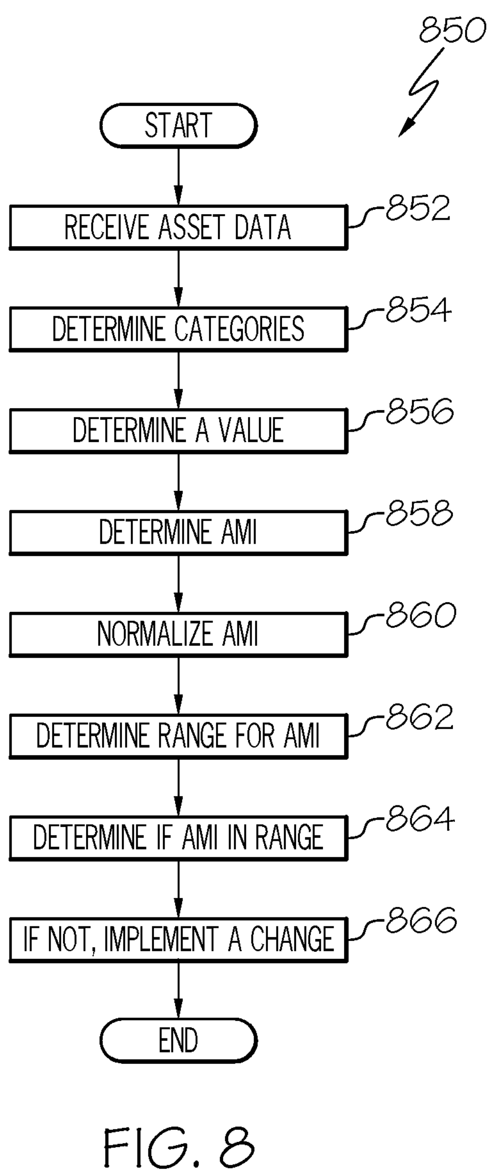
FIG. 8 depicts a flowchart for managing hydrocarbon assets, according to embodiments provided herein.

FIG. 8 depicts a flowchart 850 for managing hydrocarbon assets, according to embodiments provided herein. As illustrated in block 852, asset data associated with a plurality of hydrocarbon assets at an operations facility may be received. In block 854, a plurality of categories of asset data may be determined, where the plurality of categories include at least the following: MI, P&EI, OCI, or LCI, and where each of the plurality of categories of asset data include key performance indicators (KPIs). In block 856, a value for each of the categories of asset data may be determined, which includes determining a value for each of the KPIs. In block 858, a value for AMI for the hydrocarbon operating facility may be determined, where the value for AMI includes the value for each of the categories of asset data. In block 860, the AMI may be normalized. In block 862, an acceptable range for AMI may be determined. In block 864, a determination may be made regarding whether the AMI is within the acceptable range for AMI. In block 866, in response to determining that the AMI is not within the acceptable range for AMI, a change to at least one of the KPI may be implemented until AMI is within the acceptable range for AMI.

Figure 9:
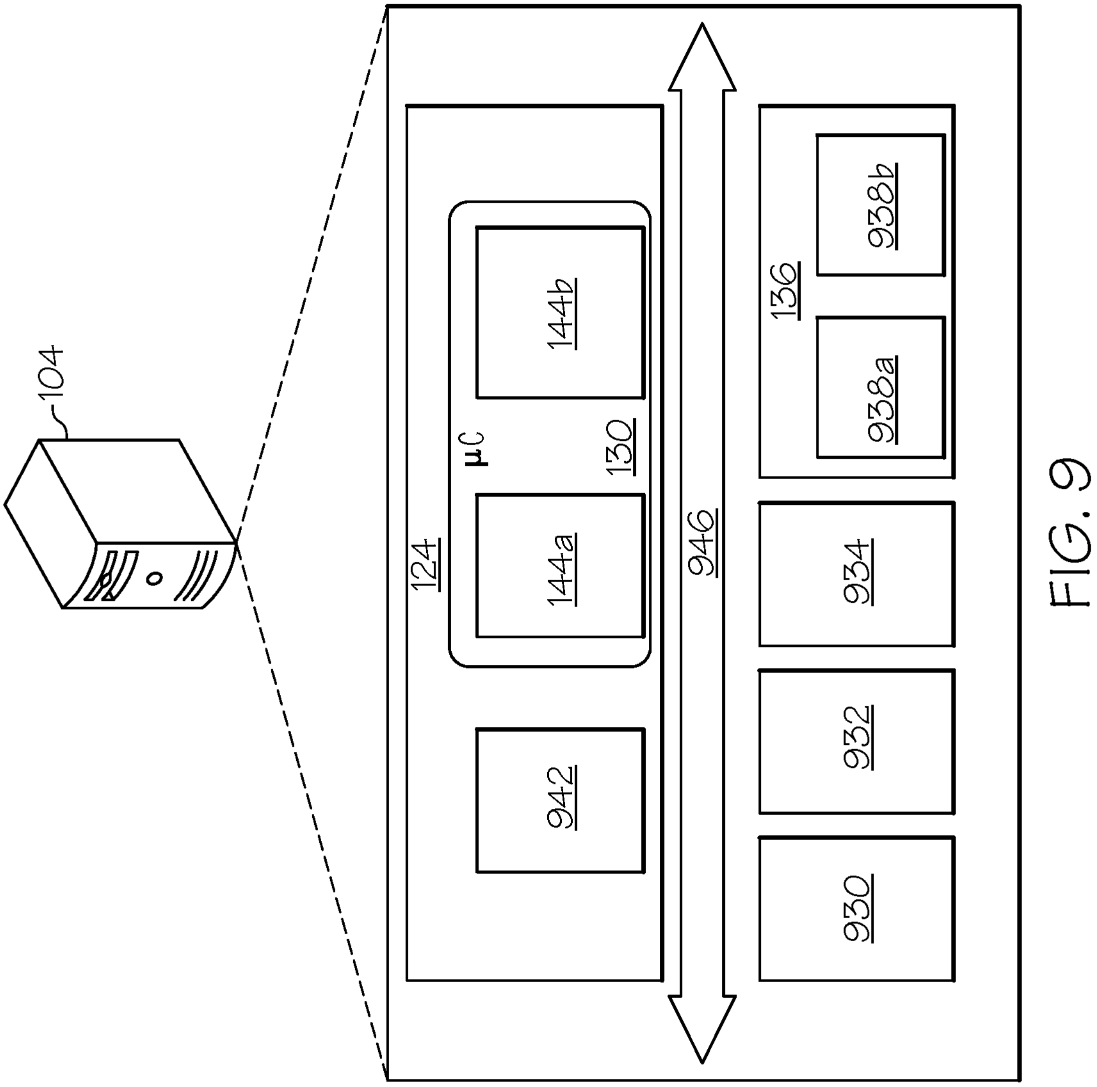
FIG. 9 depicts a hydrocarbon asset control system for managing hydrocarbon assets, according to embodiments disclosed herein.

FIG. 9 depicts a hydrocarbon asset control system 104 for managing hydrocarbon assets, according to embodiments disclosed herein. As illustrated, the hydrocarbon asset control system 104 includes a processor 930, input/output hardware 932, a network interface hardware 934, a hydrocarbon asset operational data memory 124 from FIG. 1B (which stores KPI data 938*a*, asset data 938*b*, and/or other data), and a memory component 924. The memory component 924 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable storage medium. Depending on the particular embodiment, these non-transitory computer-readable mediums may reside within the hydrocarbon asset control system 104 and/or external to the hydrocarbon asset control system 104.

The memory component 924 may store operating logic 942 and any hydrocarbon asset management software, which may include AMI determining logic 144*a*, and hydrocarbon asset controlling logic 144*b*. These logic components may include a plurality of different pieces of logic, each of which may be embodied as a computer program, firmware, and/or hardware, as an example. A local communications interface 946 is also included in FIG. 9 and may be implemented as a bus or other communication interface to facilitate communication among the components of the hydrocarbon asset control system 104.

The processor 930 may include any processing component operable to receive and execute instructions (such as from the hydrocarbon asset operational data memory 124 and/or the memory component 924). As described above, the input/output hardware 932 may include and/or be configured to interface with speakers, microphones, and/or other input/output components.

The network interface hardware 934 may include and/or be configured for communicating with any wired or wireless networking hardware, including an antenna, a modem, a LAN port, wireless fidelity (Wi-Fi) card, WiMAX card, mobile communications hardware, and/or other hardware for communicating with other networks and/or devices. From this connection, communication may be facilitated between the hydrocarbon asset control system 104 and other computing devices.

The operating logic 942 may include an operating system and/or other software for managing components of the hydrocarbon asset control system 104. As discussed above, AMI determining logic 144*a* may reside in the hydrocarbon asset operational data memory 124 and may be configured to cause the processor 930 to receive sensor data, as well as user input regarding the KPIs and determine AMI for one or more operating facilities 106, departments, companies, etc. The hydrocarbon asset controlling logic 144*b* may be configured to use AMI for making adjustments to one or more hydrocarbon assets 116 to improve AMI.

It should be understood that while the components in FIG. 9 are illustrated as residing within the hydrocarbon asset control system 104, this is merely an example. In some embodiments, one or more of the components may reside external to the hydrocarbon asset control system 104 or within other devices. It should also be understood that, while the hydrocarbon asset control system 104 is illustrated as a single device, this is also merely an example. In some embodiments, the operating logic 942, the AMI determining logic 144*a*, and/or the hydrocarbon asset controlling logic 144*b* may reside on different devices.

Additionally, while the hydrocarbon asset control system 104 is illustrated with the operating logic 942, the AMI determining logic 144*a*, and/or the hydrocarbon asset controlling logic 144*b* as separate logical components, this is also an example. In some embodiments, a single piece of logic may provide the described functionality. It should also be understood that while the operating logic 942, the AMI determining logic 144*a*, and/or the hydrocarbon asset controlling logic 144*b* are described herein as the logical components, this is also an example. Other components may also be included, depending on the embodiment.

Various aspects for managing hydrocarbon assets in a hydrocarbon operating facility are disclosed.

Specifically, a first aspect includes a hydrocarbon asset control system for managing hydrocarbon assets for a hydrocarbon operating facility, comprising: a hydrocarbon operating facility that includes hydrocarbon assets; at least one hydrocarbon asset monitoring module for receiving operational data related to the hydrocarbon assets; a hydrocarbon asset operational data memory that stores operational data related to the hydrocarbon assets of the hydrocarbon operating facility; a hydrocarbon asset management output translation module; a hydrocarbon asset manager comprising a hydrocarbon asset management software module that, when executed by a processor, causes the hydrocarbon asset control system to perform at least the following: receive, from the at least one hydrocarbon asset monitoring module via a transmitter of the hydrocarbon operating facility, at least a portion of the asset data associated with the hydrocarbon assets at an operations facility, wherein at least a portion of the asset data was received via a sensor of at least one of one of the hydrocarbon assets; determine a plurality of categories of asset data, wherein the plurality of categories include at least the following: an asset maintainability index (MI), an asset performance and efficiency index (P&EI), an objective compliance index (OCI), or a level of competency index (LCI), wherein each of the plurality of categories of asset data include key performance indicators (KPIs); determine a value for each of the plurality of categories of asset data, wherein determining the value for each of the plurality of categories of asset data includes determining a value for each of the KPIs; determine a value for an asset management index (AMI) for the hydrocarbon operating facility, wherein the value for AMI includes the value for each of the plurality of categories of asset data; normalize the AMI; determine an acceptable range for AMI; determine whether the AMI is within the acceptable range for AMI; and communicate data related to whether the AMI is within the acceptable range to the hydrocarbon asset management output translation module to enable a change to at least a portion of the hydrocarbon assets by adjusting a respective KPI until AMI is within the acceptable range for AMI.

A second aspect includes the hydrocarbon asset control system of the first aspect, wherein the hydrocarbon asset management software module further causes the hydrocarbon asset control system to perform, at least the following: in response to determining that the AMI is not within the acceptable range for AMI, utilize the hydrocarbon asset management output translation module to implement a change to at least a portion of the hydrocarbon assets to adjust.

A third aspect includes the hydrocarbon asset control system of the first and/or second aspect, wherein the KPIs for MI include at least one of the following: rework data (RD), qualitative repair history index (QRHI), failure reporting, analysis, and corrective action system (FRACAS) index, mean time between failures (MTBF), equipment availability (EA) data, relief valve inspection index (RVII), or on stream inspection index (OSII).

A fourth aspect includes the hydrocarbon asset control system of any of the first aspect through the third aspect, wherein the KPIs for P&EI include at least one of the following: asset integrity management solution (AIMS), lubrication index (LI), corrosion management solution (CMS), or reliability, availability, and maintenance modeling (RAM) utilization.

A fifth aspect includes the hydrocarbon asset control system of any of the first aspect through the fourth aspect, wherein the KPIs for OCI include at least one of the following: flaring index, energy conservation index, or production index.

A sixth aspect includes the hydrocarbon asset control system of any of the first aspect through the fifth aspect, wherein the KPIs for LCI include at least one of the following: a competency index for technicians, a competency index for operators, and a competency index for inspectors.

A seventh aspect includes the hydrocarbon asset control system of any of the first aspect through the sixth aspect, wherein AMI for the hydrocarbon operating facility is determined from the following formula: 0.4*MI+0.3*P&EI+0.2*OCI+0.1*LCI.

An eighth aspect includes the hydrocarbon asset control system of any of the first aspect through the seventh aspect, wherein the hydrocarbon asset management software module provides an AMI dashboard via a graphical user interface.

A ninth aspect includes a method for managing hydrocarbon assets for a hydrocarbon operating facility, comprising: receiving, by a computing device, asset data associated with a plurality of hydrocarbon assets at an operations facility; determining, by the computing device, a plurality of categories of asset data, wherein the plurality of categories include at least the following: an asset maintainability index (MI), an asset performance and efficiency index (P&EI), an objective compliance index (OCI), or a level of competency index (LCI), wherein each of the plurality of categories of asset data include key performance indicators (KPIs); determining, by the computing device, a value for each of the plurality of categories of asset data, wherein determining the value for each of the plurality of categories of asset data includes determining a value for each of the KPIs; determining, by the computing device, a value for an asset management index (AMI) for the hydrocarbon operating facility, wherein the value for AMI includes the value for each of the plurality of categories of asset data; normalizing, by the computing device, the AMI; determining, by the computing device, an acceptable range for AMI; determining, by the computing device, whether the AMI is within the acceptable range for AMI; and communicating, by the computing device, data related to whether the AMI is within the acceptable range to the hydrocarbon asset management output translation module to enable a change to at least a portion of the hydrocarbon assets by adjusting a respective KPI until AMI is within the acceptable range for AMI.

A tenth aspect includes the method of the ninth aspect, wherein the KPIs for MI include at least one of the following: rework data (RD), qualitative repair history index (QRHI), failure reporting, analysis, and corrective action system (FRACAS) index, mean time between failures (MTBF), equipment availability (EA) data, relief valve inspection index (RVII), or on stream inspection index (OSII).

An eleventh aspect includes the method of the ninth aspect and/or the tenth aspect, wherein the KPIs for P&EI include at least one of the following: asset integrity management solution (AIMS), lubrication index (LI), corrosion management solution (CMS), or reliability, availability, and maintenance modeling (RAM) utilization.

A twelfth aspect includes the method of any of the ninth aspect through the eleventh aspect, wherein the KPIs for OCI include at least one of the following: flaring index, energy conservation index, or production index.

A thirteenth aspect includes the method of any of the ninth aspect through the twelfth aspect, wherein the KPIs for LCI include at least one of the following: a competency index for technicians, a competency index for operators, and a competency index for inspectors.

A fourteenth aspect includes the method of any of the ninth aspect through the thirteenth aspect, wherein AMI for the hydrocarbon operating facility is determined from the following formula: 0.4*MI+0.3*P&EI+0.2*OCI+0.1*LCI.

A fifteenth aspect includes the method of any of the eighth aspect through the thirteenth aspect, further comprising providing an AMI dashboard via a graphical user interface.

A sixteenth aspect includes a non-transitory computer-readable storage medium for managing hydrocarbon assets for a hydrocarbon operating facility that includes logic that, when executed by a computing device, causes the computing device to perform at least the following: receive asset data associated with a plurality of hydrocarbon assets at an operations facility; determine a plurality of categories of asset data, wherein the plurality of categories include at least the following: an asset maintainability index (MI), an asset performance and efficiency index (P&EI), an objective compliance index (OCI), or a level of competency index (LCI), wherein each of the plurality of categories of asset data include key performance indicators (KPIs); determine a value for each of the plurality of categories of asset data, wherein determining the value for each of the plurality of categories of asset data includes determining a value for each of the KPIs; determine a value for an asset management index (AMI) for the hydrocarbon operating facility, wherein the value for AMI includes the value for each of the plurality of categories of asset data; determine an acceptable range for AMI; determine whether the AMI is within the acceptable range for AMI; and in response to determining that the AMI is not within the acceptable range for AMI, implement a change to at least one of the KPI until AMI is within the acceptable range for AMI.

A seventeenth aspect includes the non-transitory computer-readable storage medium of the sixteenth aspect, wherein the KPIs for MI include at least one of the following: rework data (RD), qualitative repair history index (QRHI), failure reporting, analysis, and corrective action system (FRACAS) index, mean time between failures (MTBF), equipment availability (EA) data, relief valve inspection index (RVII), or on stream inspection index (OSII).

An eighteenth aspect includes the non-transitory computer-readable storage medium of the sixteenth aspect and/or the seventeenth aspect, wherein the KPIs for P&EI include at least one of the following: asset integrity management solution (AIMS), lubrication index (LI), corrosion management solution (CMS), or reliability, availability, and maintenance modeling (RAM) utilization.

A nineteenth aspect includes the non-transitory computer-readable storage medium of any of the sixteenth aspect through the eighteenth aspect, wherein the KPIs for OCI include at least one of the following: flaring index, energy conservation index, or production index.

A twentieth aspect includes the non-transitory computer-readable storage medium of any of the sixteenth aspect through the nineteenth aspect, wherein the KPIs for LCI include at least one of the following: a competency index for technicians, a competency index for operators, and a competency index for inspectors.

A twenty-first aspect includes the non-transitory computer-readable storage medium of any of the sixteenth aspect through the twentieth aspect, wherein AMI for the hydrocarbon operating facility is determined from the following formula: 0.4*MI+0.3*P&EI+0.2*OCI+0.1*LCI.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. Further, the scope of the present disclosure is intended to cover all permutations and sub-permutations of all elements, features, and aspects discussed above. All such modifications and variations are intended to be included herein within the scope of this disclosure.

Therefore, at least the following is claimed:

1. A hydrocarbon asset control system for managing hydrocarbon assets for a hydrocarbon operating facility, comprising:
- a hydrocarbon operating facility that includes hydrocarbon assets;
- at least one hydrocarbon asset monitoring module for receiving operational data related to the hydrocarbon assets;
- a hydrocarbon asset operational data memory that stores operational data related to the hydrocarbon assets of the hydrocarbon operating facility;
- a hydrocarbon asset management output translation module;
- a hydrocarbon asset manager comprising a hydrocarbon asset management software module that, when executed by a processor, causes the hydrocarbon asset control system to perform at least the following:
  - receive, from the at least one hydrocarbon asset monitoring module via a transmitter of the hydrocarbon operating facility, at least a portion of the asset data associated with the hydrocarbon assets at an operations facility, wherein at least a portion of the asset data was received via a sensor of at least one of one of the hydrocarbon assets;
  - determine a plurality of categories of asset data, wherein the plurality of categories include at least the following: an asset maintainability index (MI), an asset performance and efficiency index (P&EI), an objective compliance index (OCI), or a level of competency index (LCI), wherein each of the plurality of categories of asset data include key performance indicators (KPIs);
  - determine a value for each of the plurality of categories of asset data, wherein determining the value for each of the plurality of categories of asset data includes determining a value for each of the KPIs;
  - determine a value for an asset management index (AMI) for the hydrocarbon operating facility, wherein the value for AMI includes the value for each of the plurality of categories of asset data, wherein the value for AMI for the hydrocarbon operating facility is determined based on a summation of a weighting of MI, P&EI, OCI, and LCI;
  - normalize the AMI;
  - determine an acceptable range for AMI;
  - determine whether the AMI is within the acceptable range for AMI; and
  - communicate data related to whether the AMI is within the acceptable range to the hydrocarbon asset management output translation module to enable a change to at least a portion of the hydrocarbon assets by adjusting a respective KPI until AMI is within the acceptable range for AMI.

2. The hydrocarbon asset control system of claim 1, wherein the hydrocarbon asset management software module further causes the hydrocarbon asset control system to perform, at least the following: in response to determining that the AMI is not within the acceptable range for AMI, utilize the hydrocarbon asset management output translation module to implement a change to at least a portion of the hydrocarbon assets to adjust.

3. The hydrocarbon asset control system of claim 1, wherein the KPIs for MI include rework data (RD), qualitative repair history index (QRHI), failure reporting, analysis, and corrective action system (FRACAS) index, mean time between failures (MTBF), equipment availability (EA) data, relief valve inspection index (RVII), and on stream inspection index (OSII).

4. The hydrocarbon asset control system of claim 1, wherein the KPIs for P&EI include at least one of the following: asset integrity management solution (AIMS), lubrication index (LI), corrosion management solution (CMS), or reliability, availability, and maintenance modeling (RAM) utilization.

5. The hydrocarbon asset control system of claim 1, wherein the KPIs for OCI include at least one of the following: flaring index, energy conservation index, or production index.

6. The hydrocarbon asset control system of claim 1, wherein the KPIs for LCI include at least one of the following: a competency index for technicians, a competency index for operators, and a competency index for inspectors.

7. The hydrocarbon asset control system of claim 1, wherein AMI for the hydrocarbon operating facility is determined from the following formula: 0.4*MI+0.3*P&EI+0.2*OCI+0.1*LCI.

8. The hydrocarbon asset control system of claim 1, wherein the hydrocarbon asset management software module provides an AMI dashboard via a graphical user interface.

9. A method for managing hydrocarbon assets for a hydrocarbon operating facility, comprising:

- receiving, by a computing device, asset data associated with a plurality of hydrocarbon assets at an operations facility;
- determining, by the computing device, a plurality of categories of asset data, wherein the plurality of categories include at least the following: an asset maintainability index (MI), an asset performance and efficiency index (P&EI), an objective compliance index (OCI), or a level of competency index (LCI), wherein each of the plurality of categories of asset data include key performance indicators (KPIs);
- determining, by the computing device, a value for each of the plurality of categories of asset data, wherein determining the value for each of the plurality of categories of asset data includes determining a value for each of the KPIs;
- determining, by the computing device, a value for an asset management index (AMI) for the hydrocarbon operating facility, wherein the value for AMI includes the value for each of the plurality of categories of asset data, wherein the value for AMI for the hydrocarbon operating facility is determined based on a summation of a weighting of MI, P&EI, OCI, and LCI;
- normalizing, by the computing device, the AMI;
- determining, by the computing device, an acceptable range for AMI;
- determining, by the computing device, whether the AMI is within the acceptable range for AMI; and
- communicating, by the computing device, data related to whether the AMI is within the acceptable range to a hydrocarbon asset management output translation module to enable a change to at least a portion of the plurality of hydrocarbon assets by adjusting a respective KPI until AMI is within the acceptable range for AMI.

10. The method of claim 9, wherein the KPIs for MI include at least one of the following: rework data (RD), qualitative repair history index (QRHI), failure reporting, analysis, and corrective action system (FRACAS) index, mean time between failures (MTBF), equipment availability (EA) data, relief valve inspection index (RVII), or on stream inspection index (OSII).

11. The method of claim 9, wherein the KPIs for P&EI include at least one of the following: asset integrity management solution (AIMS), lubrication index (LI), corrosion management solution (CMS), or reliability, availability, and maintenance modeling (RAM) utilization.

12. The method of claim 9, wherein the KPIs for OCI include at least one of the following: flaring index, energy conservation index, or production index.

13. The method of claim 9, wherein the KPIs for LCI include at least one of the following: a competency index for technicians, a competency index for operators, and a competency index for inspectors.

14. The method of claim 9, wherein AMI for the hydrocarbon operating facility is determined from the following formula: 0.4*MI+0.3*P&EI+0.2*OCI+0.1*LCI.

15. The method of claim 9, further comprising providing an AMI dashboard via a graphical user interface.

16. A non-transitory computer-readable storage medium for managing hydrocarbon assets for a hydrocarbon operating facility that includes logic that, when executed by a computing device, causes the computing device to perform at least the following:

- receive asset data associated with a plurality of hydrocarbon assets at an operations facility;
- determine a plurality of categories of asset data, wherein the plurality of categories include at least the following: an asset maintainability index (MI), an asset performance and efficiency index (P&EI), an objective compliance index (OCI), or a level of competency index (LCI), wherein each of the plurality of categories of asset data include key performance indicators (KPIs);
- determine a value for each of the plurality of categories of asset data, wherein determining the value for each of the plurality of categories of asset data includes determining a value for each of the KPIs;
- determine a value for an asset management index (AMI) for the hydrocarbon operating facility, wherein the value for AMI includes the value for each of the plurality of categories of asset data, wherein the value for AMI for the hydrocarbon operating facility is determined based on a summation of a weighting of MI, P&EI, OCI, and LCI;
- determine an acceptable range for AMI;
- determine whether the AMI is within the acceptable range for AMI; and
- in response to determining that the AMI is not within the acceptable range for AMI, implement a change to at least one of the KPI until AMI is within the acceptable range for AMI.

17. The non-transitory computer-readable storage medium of claim 16, wherein the KPIs for MI include at least one of the following: rework data (RD), qualitative repair history index (QRHI), failure reporting, analysis, and corrective action system (FRACAS) index, mean time between failures (MTBF), equipment availability (EA) data, relief valve inspection index (RVII), or on stream inspection index (OSII).

18. The non-transitory computer-readable storage medium of claim 16, wherein the KPIs for P&EI include at least one of the following: asset integrity management solution (AIMS), lubrication index (LI), corrosion management solution (CMS), or reliability, availability, and maintenance modeling (RAM) utilization.

19. The non-transitory computer-readable storage medium of claim 16, wherein the KPIs for OCI include at least one of the following: flaring index, energy conservation index, or production index, and wherein the KPIs for LCI include at least one of the following: a competency index for technicians, a competency index for operators, and a competency index for inspectors.

* * * * *